United States Patent
Wong et al.

(10) Patent No.: US 7,780,774 B2
(45) Date of Patent: Aug. 24, 2010

(54) METHOD OF MAKING A PIGMENTED PHASE CHANGE INK WITH DISPERSANT AND SYNERGIST

(75) Inventors: Raymond W. Wong, Mississauga (CA); Marcel P. Breton, Mississauga (CA); James D. Mayo, Mississauga (CA); C. Geoffrey Allen, Waterdown (CA); Vladislav Skorokhod, Mississauga (CA); Edward G. Zwartz, Mississauga (CA); Kimberly D. Nosella, Mississauga (CA); Christine D. Anderson, Atlanta, GA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/360,403

(22) Filed: Jan. 27, 2009

(65) Prior Publication Data

US 2010/0186624 A1    Jul. 29, 2010

(51) Int. Cl.
*C09D 11/02*    (2006.01)
(52) U.S. Cl. .................................................. 106/31.61
(58) Field of Classification Search .............. 106/31.61
See application file for complete search history.

(56) References Cited

U.S. PATENT DOCUMENTS

| | | | |
|---|---|---|---|
| 3,996,059 A | 12/1976 | Stansfield et al. | |
| 4,251,824 A | 2/1981 | Hara et al. | |
| 4,410,899 A | 10/1983 | Haruta et al. | |
| 4,412,224 A | 10/1983 | Sugitani | |
| 4,532,530 A | 7/1985 | Hawkins | |
| 4,601,777 A | 7/1986 | Hawkins et al. | |
| 6,309,453 B1 | 10/2001 | Banning et al. | |
| 6,547,380 B2 | 4/2003 | Smith et al. | |
| 6,702,884 B2 | 3/2004 | Brown | |
| 6,858,070 B1 | 2/2005 | Wong et al. | |
| 6,860,930 B2 | 3/2005 | Wu et al. | |
| 6,878,198 B1 * | 4/2005 | Drappel et al. ........... | 106/31.86 |
| 7,293,868 B2 | 11/2007 | Odell et al. | |
| 7,407,539 B2 | 8/2008 | Wu et al. | |
| 7,427,323 B1 * | 9/2008 | Birau et al. .................. | 106/497 |
| 2005/0113482 A1 * | 5/2005 | Wong et al. .................. | 523/160 |
| 2006/0117992 A1 | 6/2006 | Goredema et al. | |
| 2007/0030322 A1 | 2/2007 | Lee et al. | |
| 2007/0131138 A1 | 6/2007 | Wong et al. | |
| 2008/0098927 A1 | 5/2008 | Allen et al. | |
| 2008/0098929 A1 | 5/2008 | Turek et al. | |
| 2008/0098930 A1 * | 5/2008 | Wong et al. ............... | 106/31.29 |

FOREIGN PATENT DOCUMENTS

| | | |
|---|---|---|
| EP | 1 535 974 A1 | 6/2005 |
| EP | 1 916 280 A1 | 4/2008 |

OTHER PUBLICATIONS

New U.S. Patent Application, filed Jan. 27, 2009, Raymond Wong at al.
European Search Report for European Patent Application No. 10151275.4, dated May 4, 2010.

* cited by examiner

*Primary Examiner*—Jerry Lorengo
*Assistant Examiner*—Veronica Faison Gee
(74) *Attorney, Agent, or Firm*—Oliff & Berridge, PLC

(57) ABSTRACT

A method of making a phase change ink composition includes adding to a device with a stirring element at least one pigment, at least one dispersant and at least one synergist, processing the device at an elevated temperature and at a stirring rate to wet the at least one pigment to obtain an ink concentrate, and mixing the ink concentrate with an ink vehicle to obtain the ink composition. The device may be an extruder, an attritor or the like. The method allows for the reduction in the amount of dispersant to include in the ink.

21 Claims, No Drawings

METHOD OF MAKING A PIGMENTED PHASE CHANGE INK WITH DISPERSANT AND SYNERGIST

BACKGROUND

Described herein is a method of making a phase change ink composition comprising an ink vehicle and at least one pigment, wherein the ink composition is substantially solid at room temperature and includes at least one dispersant and at least one synergist. The dispersant and synergist allow the pigment to be well dispersed in the solid phase change ink composition without adversely affecting the hardness of the ink. The phase change inks are suitable for ink jet printing processes.

Advantages achieved herein include that the use of at least one dispersant and at least one synergist results in very stable inks, as determined by the measurement of particle size after subjecting the inks to high temperatures, for example 100° C., for extended periods of time, for example 1 week. Furthermore, the amount of dispersant, in particular dispersants that are liquid or paste-like at room temperature, required to stabilize the pigment in the ink can be reduced without sacrificing ink stability, thereby also achieving a reduction in the tackiness of the ink during processing and on image prints from the subsequent printed ink.

REFERENCES

Ink jet printing processes may employ inks that are solid at room temperature, for example from about 20° C. to about 27° C., and that are liquid at elevated jetting temperatures, for example of from about 60° C. to about 150° C. Such inks are typically referred to as hot melt inks or phase change inks.

In ink jet printing processes employing a phase change ink, the substantially solid ink is melted by the heater in the printing apparatus and jetted as a liquid in a manner similar to that of conventional liquid ink jet printing. Upon contact with the printing substrate, which can be either an intermediate transfer medium, such as an aluminum drum, or the receiving substrate, such as paper or transparency material, the molten ink solidifies rapidly, desirably solidifying at a rate enabling the colorant to substantially remain on the surface of the substrate instead of being carried into the substrate (for example, paper) by capillary action, thereby enabling higher print density than is generally obtained with liquid inks. Advantages of a phase change ink in ink jet printing thus include little or no evaporation of the ink's components, elimination of potential spillage of the ink during handling, a wide range of print density and quality, minimal paper cockle or distortion, and enablement of indefinite periods of non-printing without the danger of nozzle clogging, even without capping the nozzles.

U.S. Patent Application Publication No. 2008/0098929, incorporated herein by reference in its entirety, describes a phase change ink having an ink vehicle, at least one colorant, at least one triamide and at least one bis-urethane. The at least one triamide and at least one bis-urethane can assist in dispersing colorants, such as pigments like carbon black, in non-polar ink vehicles.

U.S. Patent Application Publication No. 2008/0098927, incorporated herein by reference in its entirety, describes a pigmented phase change ink composition comprising an ink carrier, a dispersing agent, and pigment particles. The ink can be resistant to substantial aggregation and settling of the pigment particles in the melt and even when exposed to freeze thaw cycles.

U.S. Pat. No. 7,407,539, incorporated herein by reference in its entirety, describes a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end.

U.S. Pat. No. 7,293,868, incorporated herein by reference in its entirety, describes ink compositions that include one or more radiation curable oil soluble components and one or more thermal solvents, as well as methods of preparing such ink compositions and methods of using such ink compositions.

U.S. Pat. No. 6,860,930, incorporated herein by reference in its entirety, describes a phase change ink composition comprising (a) a colorant and (b) a carrier comprising a polyamide, wherein the polyamide component of the carrier contains at least about 10 percent by weight of a branched triamide.

Solid inks typically employ dyes as colorants. Certain dyes are very expensive, contributing a significant amount to the ink cost, and may suffer from poor lightfastness, dye migration/bleeding issues and/or poor solubility. Pigments can be significantly less costly than dyes and offer excellent color and thermal stability, and improved colorant migration resistance properties.

In phase change inks, a dispersant may be used to assist in stabilizing the dispersion of the pigment of the ink in the ink vehicles. In order to effectively stabilize the pigment, higher dispersant loadings have been used, for example loading amounts of 5% by weight or more of the ink. However, the higher loading of the dispersant may adversely affect the hardness of the ink, resulting in an ink with relatively soft and tacky characteristics. Prints formed with such an ink may experience higher incidences of sticking and transfer to a transfuse drum used during the image formation process. While decreasing the amount of dispersant can avoid undesirable softening of the ink, the pigment may not be sufficiently stabilized in the ink, creating other potential problems such as long term ink stability, which can negatively impact jetting reliability.

What is desired is a phase change ink composition that includes a stabilized pigmented ink system that is not soft and tacky, and a process of making such an ink.

SUMMARY

These and other objects are achieved herein, where, in embodiments, disclosed is a method of making a phase change ink composition, comprising adding to a device with a stirring element at least one pigment, at least one dispersant and at least one synergist, processing the device at an elevated temperature and at a stirring rate to wet the at least one pigment to obtain an ink concentrate, and mixing the ink concentrate with an ink vehicle to obtain the ink composition.

In further embodiments, described is a method of making a phase change ink composition, comprising adding to an extruder at least one pigment and at least one synergist, processing the extruder to wet and shear the at least one pigment, following the processing to wet and shear the at least one pigment, adding to the extruder at least one dispersant for the at least one pigment, extruding to obtain an extrudate, and homogenization of the extrudate with an ink vehicle to obtain the ink composition.

In still further embodiments, described is a method of making a phase change ink composition having a reduced amount of dispersant for pigment, comprising determining an amount of dispersant in an ink composition comprised of at least one pigment and at least one dispersant, but free of synergist, reducing the amount of the dispersant to include in the ink composition by from about 10% to about 90% by weight of the dispersant, adding to a device with a stirring element the at least one pigment and the at least one reduced amount of dispersant of the ink composition, along with at least one synergist, processing the device at an elevated temperature and at a stirring rate to wet the at least one pigment to obtain an ink concentrate, and mixing the ink concentrate with an ink vehicle to obtain the ink composition with the reduced amount of dispersant.

EMBODIMENTS

The phase change inks herein are substantially solid at temperatures of about 20° C. to about 27° C., for example room temperature, and specifically are substantially solid at temperatures below about 40° C. However, the inks change phase upon heating, and are in a molten state at jetting temperatures. Thus, the inks have a viscosity of from about 1 to about 40 centipoise (cP), such as from about 5 to about 15 cP or from about 8 to about 12 cP, at an elevated temperature suitable for ink jet printing, such as temperatures of from about 50° C. to about 150° C.

In this regard, the inks herein may be regarded as low energy inks. Low energy inks are solid at a temperature below about 40° C. and have a viscosity of from about 5 to about 15 cP at a jetting temperature of from about 50° C. to about 150° C., such as from about 70° C. to about 130° C. or from about 60° C. to about 130° C. The inks jet at lower temperatures, and thus require lower amounts of energy for jetting.

Any suitable ink vehicle can be employed. Typically, phase change inks include a wax based vehicle.

The wax in the vehicle may act as a phase change agent in the ink. Specifically, the ink undergoes a phase change by being solid at room temperature and molten at jetting temperatures. The wax thus promotes the increase in viscosity and hardness of the ink as it cools from the jetting temperature, for example from about 75° C. to about 150° C., to the substrate temperature, which is for example from about 20° C. to about 65° C.

As used herein, the term wax includes, for example, natural, modified natural, synthetic waxes and compounded waxes. Natural waxes may be of vegetable, animal, or mineral origin. Modified waxes are natural waxes that have been treated chemically to change their nature and properties. Synthetic waxes are made by the reaction or polymerization of chemicals. Compounded waxes are mixtures of various waxes or of waxes with resins or other compounds added thereto.

Suitable waxes can include paraffins, olefins such as polymethylene, polyethylene and polypropylene, microcrystalline waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers and mixtures thereof.

Suitable phase change waxes include polyethylene waxes, including hydroxyl-terminated polyethylene waxes such as mixtures of carbon chains with the structure $CH_3—(CH_2)_n$ $CH_2OH$, where there is a mixture of chain lengths, n, where the average chain length is in the range of about 16 to about 50, and linear low molecular weight polyethylene, of similar average chain length. Suitable examples of such waxes include, for example, UNILIN 350, UNILIN 425, UNILIN 550 and UNILIN 700. All of these waxes are commercially available from Baker-Petrolite.

Examples of suitable specific ink vehicles include, for example, ethylene/propylene copolymers, such as those available from Baker Petrolite having the general formula

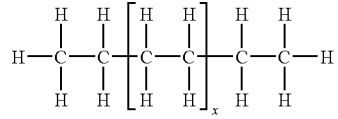

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a number average molecular weight (Mn) of from about 100 to about 5,000, such as from about 200 to about 4,000 or from about 400 to about 3,000. Commercial examples of such copolymers include, for example, the POLYWAX® line of waxes from Baker-Petrolite.

The ability of the wax to crystallize contributes to its overall hardness, which imparts strength to the ink. The degree of crystallization can be controlled by regulating the degree of branching (that is, irregularity) of the wax. A high degree of linearity of a polyethylene chain generally yields a highly crystalline and hard material. The hardness of the ink is also directly dependant on the molecular weight of the waxy components, such that higher molecular weight waxes afford inks that are relatively harder and potentially more robust.

Other suitable phase change waxes include alcohol waxes, for example, hydrogenated castor oil, 1-octadecanol, 1,10-decanediol and 1,12-dodecanediol. Other examples of mono functional alcohols that can be employed as phase change waxes herein include 1-tetradecanol, 1-pentadecanol, 1-hexadecanol, 1-heptadecanol, 1-nonadecanol, 1-eicosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol. Also suitable are Guerbet alcohols such as 2-tetradecyl 1-octadecanol, 2-hexadecyl 1-eicosanol, 2-octadecyl 1-docosanol, 2-nonadecyl 1-tricosanol, 2-eicosyl tetracosanol, and mixtures thereof. Suitable diols include 1,8-octanediol, 1,9-nonanediol, 1,13-tridecanediol, 1,14-tetradecanediol, 1,15-pentadecanediol, 1,16-hexandecanediol, 1,17-heptadecanediol, 1,18-octadecanediol, 1,19-nonadecanediol, 1,20-eicosanediol, 1,22-docosanediol, 1,25-pentacosanediol, and mixtures thereof.

Other suitable phase change waxes include carboxylic acid waxes, for example, UNICID® 350, UNICID® 425, UNICID® 550 and UNICID® 700. All of these waxes are commercially available from Baker-Petrolite.

Examples of urethane waxes that may be used include the reaction product of an isocyanate and an alcohol. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include n-octadecylisocyanate, hexadecylisocyanate; octylisocyanate; n- and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like, as well as mixtures thereof. Examples of diisocyanates include isophorone diisocyanate (IPDI), toluene diisocyanate (TDI); diphenylmethane-4,4'-diisocyanate (MDI); hydrogenated diphenylmethane-4,4'-diisocyanate; tetra-methyl xylene diisocyanate (TMXDI); hexamethylene-1,6-diisocyanate (HDI), naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethyl-1,6-diisocyanatohexane, tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

In embodiments, the wax is functionalized with one or more curable moieties, including, for example, vinyl ethers; epoxides, such as cycloaliphatic epoxides, aliphatic epoxides, and glycidyl epoxides; oxetanes; (meth)acrylates, that is, acrylates and methacrylates; and the like.

Additional examples of wax materials that may be used as the ink vehicle are set forth in, for example, U.S. Pat. No. 6,860,930, incorporated herein by reference in its entirety.

The ink vehicle may also include fatty amides, such as monoamides, tetra-amides, mixtures thereof, and the like, for example such as described in U.S. Pat. No. 6,858,070, incorporated herein by reference in its entirety. Suitable monoamides may have a melting point of at least about 50° C., for example from about 50° C. to about 150° C., although the melting point can be above or below these temperatures. Specific examples of suitable monoamides include, for example, primary monoamides and secondary monoamides. Stearamide, such as KEMAMIDE S available from Witco Chemical Company and CRODAMIDE S available from Croda, behenamide/arachidamide, such as KEMAMIDE B available from Witco and CRODAMIDE BR available from Croda, oleamide, such as KEMAMIDE U available from Witco and CRODAMIDE OR available from Croda, technical grade oleamide, such as KEMAMIDE O available from Witco, CRODAMIDE O available from Croda, and UNISLIP 1753 available from Uniqema, and erucamide such as KEMAMIDE E available from Witco and CRODAMIDE ER available from Croda, are some examples of suitable primary amides. Behenyl behenamide, such as KEMAMIDE EX666 available from Witco, stearyl stearamide, such as KEMAMIDE S-180 and KEMAMIDE EX-672 available from Witco, stearyl erucamide, such as KEMAMIDE E-180 available from Witco and CRODAMIDE 212 available from Croda, erucyl erucamide, such as KEMAMIDE E-221 available from Witco, oleyl palmitamide, such as KEMAMIDE P-181 available from Witco and CRODAMIDE 203 available from Croda, and erucyl stearamide, such as KEMAMIDE S-221 available from Witco, are some examples of suitable secondary amides. Additional suitable amide materials include KEMAMIDE W40 (N,N'-ethylenebisstearamide), KEMAMIDE P181 (oleyl palmitamide), KEMAMIDE W45 (N,N'-thylenebisstearamide), and KEMAMIDE W20 (N,N'-ethylenebisoleamide).

Additional examples of suitable ink vehicle components for the phase change inks include rosin esters, such as glyceryl abietate (KE-100®) polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, montan wax, candelilla wax, GILSONITE (American Gilsonite Company), and the like; mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N-ethylene-bis-12-hydroxystearamide), FLEXRICIN 185 (N,N'-ethylene-bis-ricinoleamide), and the like. Further, linear long chain sulfones with from about 4 to about 16 carbon atoms, such as diphenyl sulfone, n-amyl sulfone, n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, chlorophenyl methyl sulfone, and the like, are suitable ink vehicle materials.

The ink vehicle may comprise from about 25% to about 99.5% by weight of the ink, for example from about 30% to about 90% or from about 50% to about 75% by weight of the ink.

The ink may also include therein at least one amide resin, such as a triamide, tetraamide or other higher order amide resin. The amide resin may act as a dispersant for the pigment(s) of the ink. Suitable triamides for use herein include linear triamides, which are molecules in which all three amide groups are contained within a single hydrocarbon backbone. Examples of linear triamides include those triamides having the following formulas:

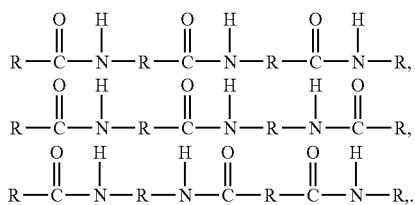

R can be any hydrocarbon having from about 1 to about 200, carbon atoms, such as from about 25 to 150 carbon atoms or from about 30 to about 100 carbon atoms.

Linear triamides can further include those wherein the three amide groups are contained within a single hydrocarbon backbone, even though the normal depiction of the molecule would suggest the amide groups are on different branches. One example of such a triamide can be expressed by the following formula:

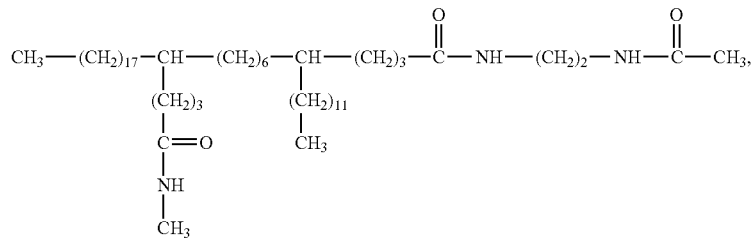

which can also be depicted as:

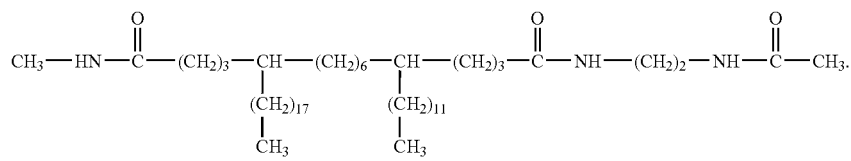

In embodiments, the triamide may also be a branched triamide. Examples of suitable branched triamides include those triamides disclosed in U.S. Pat. No. 6,860,930, which is incorporated herein in its entirety by reference. Any branched triamide disclosed in U.S. Pat. No. 6,860,930, is suitable for use herein. Examples of branched triamides suitable for use herein include those having the formulas:

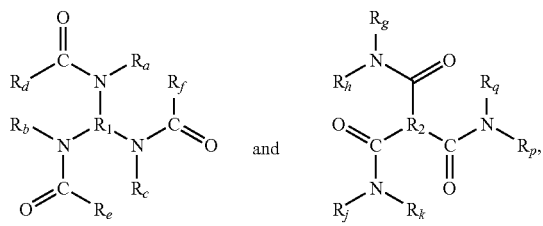

and the like are disclosed in U.S. Pat. No. 6,860,930. In such branched triamides, $R_1$ and $R_2$ may be (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), having from about 3 carbon atoms to about 200 carbon atoms, such as from about 15 carbon atoms to about 150 carbon atoms or from about 21 carbon atoms to about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), having from about 6 carbon atoms to about 200 carbon atoms, such as from about 10 carbon atoms to about 150 carbon atoms or from about 14 carbon atoms to about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), having from about 7 carbon atoms to about 200 carbon atoms, such as from about 8 carbon atoms to about 150 carbon atoms or from about 9 carbon atoms to about 100 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), having from about 7 carbon atoms to about 200 carbon atoms, such as from about 8 carbon atoms to about 150 carbon atoms or from about 9 carbon atoms to about 100 carbon atoms, although the number of carbon atoms can be outside of these ranges, such as tolylene or the like. $R_a$, $R_b$, $R_c$, $R_g$, $R_h$, $R_j$, $R_k$, $R_p$ and $R_q$ may each independently be (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in embodiments from about 1 carbon atoms to about 200 carbon atoms, such as from about 6 carbon atoms to about 150 carbon atoms or from about 10 carbon atoms to about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), having from about 6 carbon atoms to about 200 carbon atoms, such as from about 10 carbon atoms to about 150 carbon atoms or from about 14 carbon atoms to about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), having from about 6 carbon atoms to about 200 carbon atoms, such as from about 7 carbon atoms to about 150 carbon atoms or from about 8 carbon atoms to about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), having from about 6 carbon atoms to about 200 carbon atoms, such as from about 7 carbon atoms to about 150 carbon atoms or from about 8 carbon atoms to about 100 carbon atoms, although the number of carbon atoms can be outside of these ranges, such as tolyl or the like. $R_d$, $R_e$ and $R_f$ may each independently be (i) an alkyl group as described above, (ii) an aryl group as described above, (iii) an arylalkyl group as described above, or (iv) an alkylaryl group as described above.

The amide resin is present in the ink in amounts of from about 0.5 weight percent to about 40 weight percent, such as from about 5 weight percent to about 18 weight percent or from about 8 weight percent to about 13 weight percent of the ink. In embodiments, the amide resin used may be present in amounts outside of these ranges, and may also include higher order amides, such as tetraamides, pentaamides and the like.

One or more urethane resins may be included in the ink composition. Suitable urethane resins are described in, for example, U.S. Pat. No. 6,309,453, incorporated herein by reference in its entirety.

The urethane may be present in the ink in amounts of from about 0.5 weight percent to about 40 weight percent, such as from about 1 weight percent to about 8 weight percent or from about 1.5 weight percent to about 5 weight percent of the ink.

The ink of embodiments may further include conventional additives to take advantage of the known functionality associated with such conventional additives. Examples of additives are briefly discussed below.

Plasticizers may be included in the ink, and may include, for example, pentaerythritol tetrabenzoate, commercially available as BENZOFLEX S552 (Velsicol Chemical Corporation), trimethyl titrate, commercially available as CITROFLEX 1 (Monflex Chemical Company), N,N-dimethyl oleamide, commercially available as HALCOMID M-18-OL (C. P. Hall Company), a benzyl phthalate, commercially available as SANTICIZER 278 (Ferro Corporation), and the like, may be added to the ink vehicle, and may constitute from about 1 to 100 percent of the ink vehicle component of the ink. Plasticizers can either function as the ink vehicle or can act as an agent to provide compatibility between the ink propellant, which generally is polar, and the ink vehicle, which generally is non-polar.

The ink may further include an optional viscosity modifier, such as (1) 2-hydroxybenzyl alcohol, (2) 4-hydroxybenzyl alcohol, (3) 4-nitrobenzyl alcohol, (4) 4-hydroxy-3-methoxy benzyl alcohol, (5) 3-methoxy-4-nitrobenzyl alcohol, (6) 2-amino-5-chlorobenzyl alcohol, (7) 2-amino-5-methylbenzyl alcohol, (8) 3-amino-2-methylbenzyl alcohol, (9) 3-amino-4-methyl benzyl alcohol, (10) 2(2-(aminomethyl) phenylthio)benzyl alcohol, (11) 2,4,6-trimethylbenzyl alcohol, (12) 2-amino-2-methyl-1,3-propanediol, (13) 2-amino-1-phenyl-1,3-propanediol, (14) 2,2-dimethyl-1-phenyl-1,3-propanediol, (15) 2-bromo-2-nitro-1,3-propanediol, (16) 3-tert-butylamino-1,2-propanediol, (17) 1,1-diphenyl-1,2-propanediol, (18) 1,4-dibromo-2,3-butanediol, (19) 2,3-dibromo-1,4-butanediol, (20) 2,3-dibromo-2-butene-1,4-diol, (21) 1,1,2-triphenyl-1,2-ethanediol, (22) 2-naphthalenemethanol, (23) 2-methoxy-1-naphthalenemethanol, (24) decafluoro benzhydrol, (25) 2-methylbenzhydrol, (26) 1-benzeneethanol, (27) 4,4'-isopropylidene bis(2-(2,6-dibromo phenoxy)ethanol), (28) 2,2'-(1,4-phenylenedioxy)diethanol, (29) 2,2-bis(hydroxymethyl)-2,2',2"-nitrilotriethanol, (30) di(trimethylolpropane), (31) 2-amino-3-phenyl-1-propanol, (32) tricyclohexylmethanol, (33) tris (hydroxymethyl)aminomethane succinate, (34) 4,4'-trimethylene bis(1-piperidine ethanol), (35) N-methyl glucamine, (36) xylitol, or mixtures thereof. When present, the viscosity modifier is present in the ink in any effective amount, such as from about 30 percent to about 55 percent by weight of the ink or from about 35 percent to about 50 percent by weight of the ink.

The ink may optionally contain antioxidants to protect the images from oxidation and also may protect the ink components from oxidation while existing as a heated melt in the printer. Examples of suitable antioxidants include (1) N,N-hexamethylene bis(3,5-di-tert-butyl-4-hydroxy hydrocinnamamide) (IRGANOX 1098, available from Ciba-Geigy Corporation), (2) 2,2-bis(4-(2-(3,5-di-tert-butyl-4-hydroxy-hydrocinnamoyloxy))ethoxyphenyl)propane (TOPANOL-205, available from ICI America Corporation), (3) tris(4-tert-butyl-3-hydroxy-2,6-dimethyl benzyl)isocyanurate (CYANOX 1790, 41,322-4, LTDP, Aldrich D12, 840-6), (4) 2,2'-ethylidene bis(4,6-di-tert-butylphenyl) fluoro phosphonite (ETHANOX-398, available from Ethyl Corporation), (5) tetrakis(2,4-di-tert-butylphenyl)-4,4'-biphenyl diphosphonite (ALDRICH 46, 852-5; hardness value 90), (6) pentaerythritol tetrastearate (TCI America #P0739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich D14, 400-2), (15) 2-amino-4-tert-amylphenol (Aldrich 41,258-9), (16) 2,6-bis(hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Aldrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis(trifluoromethyl)benzoic acid (Aldrich 32,527-9), (30) ethyl-2-(4-(4-(trifluoromethyl)phenoxy)phenoxy)propionate (Aldrich 25,074-0), (31) tetrakis(2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Company), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The ink can also optionally contain a UV absorber. The optional UV absorbers primarily protect the generated images from UV degradation. Specific examples of suitable UV absorbers include (1) 2-bromo-2',4-dimethoxyacetophenone (Aldrich 19,948-6), (2) 2-bromo-2',5'-dimethoxyacetophenone (Aldrich 10,458-2), (3) 2-bromo-3'-nitroacetophenone (Aldrich 34,421-4), (4) 2-bromo-4'-nitroacetophenone (Aldrich 24,561-5), (5) 3',5'-diacetoxyacetophenone (Aldrich 11,738-2), (6) 2-phenylsulfonyl acetophenone (Aldrich 34,150-3), (7) 3'-aminoacetophenone (Aldrich 13,935-1), (8) 4'-aminoacetophenone (Aldrich A3,800-2), (9) 1H-benzotriazole-1-acetonitrile (Aldrich 46,752-9), (10) 2-(2H-benzotriazol-2-yl)-4,6-di-tert-pentylphenol (Aldrich 42,274-6), (11) 1,1-(1,2-ethane-diyl)bis(3,3,5,5-tetramethylpiperazinone) (commercially available from Goodrich Chemicals), (12) 2,2,4-trimethyl-1,2-hydroquinoline (commercially available from Mobay Chemical), (13) 2-(4-benzoyl-3-hydroxy phenoxy)ethylacrylate, (14) 2-dodecyl-N-(1,2,2,6,6-pentamethyl-4-piperidinyl)succinimide (commercially available from Aldrich Chemical Co., Milwaukee, Wis.), (15) 2,2,6,6-tetramethyl-4-piperidinyl/β-tetramethyl-3,9-(2,4,8,10-tetraoxo spiro(5,5)-undecane)diethyl-1,2,3,4-butane tetracarboxylate (commercially available from Fairmount), (16) N-(p-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetrame-thyl-4-piperidinyl)succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/β-tetramethyl-3,9-(2,4,8,10-tetra oxo-spiro-(5,5)undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV-Chek AM-105 from Ferro), (24) 2-amino-2',5-dichlorobenzophenone (Aldrich 10,515-5), (25) 2'-amino-4',5'-dimethoxyacetophenone (Aldrich 32,922-3), (26) 2-benzyl-2-(dimethylamino)-4'-morpholino butyrophenone (Aldrich 40,564-7), (27) 4'-benzyloxy-2'-hydroxy-3'-methylacetophenone (Aldrich 29,884-0), (28) 4,4'-bis(diethylamino)benzophenone (Aldrich 16,032-6), (29) 5-chloro-2-hydroxy benzophenone (Aldrich C4,470-2), (30) 4'-piperazinoacetophenone (Aldrich 13,646-8), (31) 4'-piperidinoacetophenone (Aldrich 11,972-5), (32) 2-amino-5-chlorobenzophenone (Aldrich A4,556-4), (33) 3,6-bis(2-methyl-2-morpholinopropionyl)-9-octylcarbazole (Aldrich 46,073-7), and the like, as well as mixtures thereof.

When present, the optional additives may each, or in combination, be present in the ink in any desired or effective amount, such as from about 1 percent to about 10 percent by weight of the ink or from about 3 percent to about 5 percent by weight of the ink.

The inks disclosed herein may contain any suitable pigment. Examples of suitable pigments include, for example, PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); HOSTAPERM Blue B2G-D (commercially available from Clariant); HOSTAPERM Blue B4G (commercially available from Clariant); Permanent Red P-F7RK; HOSTAPERM Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow D1 355, D1 351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degussa) Carbon Black 5250 and Carbon Black 5750 (commercially available from Columbia Chemical), and the like, as well as mixtures thereof.

In embodiments, the pigment may comprise from about 0.5 weight percent to about 40 weight percent of the ink, such as from about 1 weight percent to about 8 weight percent or from about 1.5 weight percent to about 6 weight percent of the ink. Pigments suitable for use herein include particles having an average particle size of from about 15 nm to about 300 nm, such as from about 30 nm to about 200 nm or from about 50 nm to about 150 nm.

There are several challenges in incorporating a pigment into a solid phase change ink composition. Typical ink compositions have many relatively non-polar components that can hinder pigment stabilization. At the same time, organic pigments can be anisotropic and have lower polarity that can make it difficult to stabilize the pigment particles in the ink. The low viscosity and high temperatures in use require a dispersant that is sufficiently anchored (such as adsorbed, covalently or ionically attached, or grafted) to the pigment particle surface such that at least a portion of the dispersant is compatible with the low polarity vehicle.

In general, pigment particles in a liquid based medium will tend to flocculate unless a suitable stabilization mechanism is employed. In non-aqueous systems, this can be achieved by adsorbing onto the pigment particle surface a molecule that is entirely or partially soluble in the ink medium, which prevents, or at least hinders, pigment particles from approaching each other too closely such that they interact and flocculate. In order to achieve good thermal stability of the ink dispersion, the dispersant must be strongly associated to the pigment surface, such that it does not desorb from the pigment surface upon aging at elevated temperatures. Addition of a suitable synergist assists in strengthening the pigment/dispersant interaction.

The synergist contains polar groups capable of anchoring, or adsorbing, to the pigment particle surface. The synergist may be insoluble in a substantial portion of the ink vehicle, although it may be soluble in a portion of the ink vehicle.

Examples of suitable polar groups that associate the synergist to the pigment particles include such functional groups as amines, amides, esters, sulfonates, carboxylic acids, hydroxyl groups, anhydrides, urethanes, ureas and salt groups such as quaternary ammonium salts, combinations thereof and the like. The polar groups anchor the synergist to the pigment particles such that the synergist is, for example, adsorbed, attached to or grafted to the pigment particle. The polar groups can suitably anchor or adsorb to the pigment particle in any suitable manner, such as by hydrogen bonding, covalent or ionic bonding, acid-base reaction, Van der Waals interactions, and the like.

Specific examples of synergists suitable for use herein include, but are not limited to, for example, SOLSPERSE® 5000 from Lubrizol (a copper phthalocyanine derivative), for example desirably used with blue, green or black pigments, SOLSPERSE® 12000 from Lubrizol, for example desirably used with blue, green or black pigments, SOLSPERSE® 22000 from Lubrizol for yellow, orange or red pigments, EFKA® 6745 from Ciba-Geigy desirably used for blue or black pigments and EFKA® 6750 from Ciba-Geigy desirably used for yellow, orange or red pigments.

In embodiments, the ink composition includes at least one synergist in an amount of from about 0.1% by weight to about 50% by weight of the pigment in the ink composition, for example from about 0.15% by weight to about 10% by weight of the pigment in the ink composition or from about 0.5 to about 5% by weight of the pigment in the ink composition. An adequate amount of synergist is sufficient to permit the amount of dispersant required to stabilize the pigment in the ink to be reduced compared to the scenario where no synergist is present in the ink, for example to be decreased by amounts of about 10 to about 90% by weight of the dispersant without a synergist, such as from about 30 to about 80% by weight of the dispersant without a synergist, or such as from about 60 to about 75% by weight of the dispersant without a synergist. The amount of dispersant in the ink composition is not particularly limited, and may be, for example, from about 0.1% by weight to about 50% by weight of the pigment in the ink composition. As above, the amount of dispersant in the ink composition may be reduced as a result of the use of the synergist. This can be particularly advantageous in cases in which the dispersant is tacky, because reducing the amount of tacky dispersant reduces the tackiness of the overall ink, which can result in less tackiness on an intermediate transfer member or image receiving surface. The reduced amount of dispersant, however, does not adversely affect the stability of the pigment(s) in the ink composition due to the use of the synergist.

Thus, in methods herein, a phase change ink composition may be made having a reduced amount of dispersant for pigment, by determining an amount of dispersant in an ink composition comprised of at least one pigment and at least one dispersant, but free of synergist, and reducing the amount of the dispersant to include in the ink composition by from about 10% to about 90% by weight of the dispersant. The determination of the amount of dispersant in an ink composition may be achieved by any suitable method, for example including known analytical methods, learning of existing composition make-up, calculating theoretical dispersant amount for a proposed ink composition, and the like.

The synergist is thus a solid that contains polar groups that can strongly adsorb onto the pigment. The dispersant, on the other hand, is soluble, or at least mainly soluble, in a substantial portion of the ink vehicle. A portion of the dispersant interacts strongly with the synergist such that the synergist/dispersant combination is strongly associated to the surface of the pigment. The combination of the synergist and the dispersant thus permits the pigment to be effectively dispersed in the solid ink medium with a desirable reduction in the loading of the dispersant while maintaining particle size stability over time at elevated temperatures. Pigmented inks are considered stable when the particle size growth of the pigment is limited to less than or equal to 15% after being aged at elevated temperature, for example, after 30 days at 120 C.

The dispersant thus comprises at least a portion of itself that is soluble in the ink vehicle, which includes at least one functional group that has an affinity for the synergist. Overall, the dispersant is partially or wholly soluble in the medium, but the at least one functional group of the dispersant interacts strongly with the synergist wherein the synergist is strongly associated to the surface of the pigment. The soluble portion of the dispersant extends into the ink medium and provides a barrier thus preventing or hindering the flocculation of pigment particles.

The dispersant generally comprises polar functional groups that interact with the synergist and a portion of which that is compatible with the ink vehicle. The polar functional groups can suitably interact with the synergist in any suitable manner, such as hydrogen bonding, covalent bonding, acid-base reaction, Van der Waals interactions, and the like. Examples of suitable polar groups include such functional groups as amines, amides, esters, sulfonates, carboxylic acids, hydroxyl groups, anhydrides, urethanes, ureas and salt groups such as quaternary ammonium salts, and the like. Examples of the portion of the dispersant that is compatible with the ink vehicle include groups such as alkyl and alkoxyl groups, which can be linear or branched, saturated or unsaturated and the like, and may have a chain length of from, for example, about 1 to about 50 carbon atoms.

Specific examples of suitable dispersants are polyester dispersants such as those disclosed in U.S. Pat. No. 6,702,884 and U.S. Pat. No. 6,841,590, the disclosures of which are totally incorporated herein by reference. Dispersants may include SOLSPERSE® 16000, SOLSPERSE® 28000, SOLSPERSE® 32500, SOLSPERSE® 38500, SOLSPERSE® 39000, SOLSPERSE® 54000, SOLSPERSE® 17000, SOL- SPERSE® 17940, SOLSPERSE® 13240, SOLSPERSE® 19000, as well as mixtures thereof.

Examples of suitable polyester dispersants are disclosed in U.S. Pat. No. 3,996,059, the disclosure of which is totally incorporated herein by reference. The dispersant may be a polyester of the formula

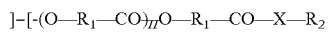

wherein each $R_1$ is an alkylene group, including linear, branched, saturated, unsaturated, cyclic. substituted, and unsubstituted alkylene groups containing at least 8 carbon atoms, such as from about 8 to about 40 carbon atoms or from about 8 to about 40 or from about 8 to about 20 carbon atoms, although the numbers can be outside these ranges; X is (i) an oxygen atom, or (ii) an alkylene group which is attached to the carbonyl group through an oxygen or nitrogen atom with at least 2 carbon atoms; $R_2$ is (i) a hydrogen atom, or (ii) a primary, secondary or tertiary amine group or a salt thereof with an acid, or a quaternary ammonium salt group; and n is an integer representing a number of repeating groups, for example from 2 to about 20 or from about 2 to about 10.

Other examples of suitable dispersants include polyalkylene succinimide dispersants such as those disclosed in U.S. Pat. No. 6,858,070, the disclosure of which is totally incorporated herein by reference. Dispersants can include the Chevron Oronite OLOA® 11000, OLOA® 11001, OLOA® 11002, OLOA® 11005, OLOA® 371, OLOA® 375, OLOA® 411, OLOA® 4500, OLOA® 46001, OLOA® 8800, OLOA® 8900, OLOA® 9000, OLOA® 9200 and the like, commercially available from Chevron Oronite Company, as well as mixtures thereof. Other suitable dispersants from Byk-Chemie include examples such as BYK P-105, an unsaturated polycarboxylic acid, BYK 9076, an alkyl ammonium salt of high molecular weight co-polymer, BYK 9077, Disperbyk 108, a hydroxy-functional carboxylic acid ester, Disperbyk 116, an acrylate co-polymer, Disperbyk 140, a solution of an alkyl ammonium salt of an acid polymer in 2-methoxy-1-methylethyl acetate, Disperbyk 168, a solution of a high molecular weight block copolymer in a dicarboxylic acid ester, Disperbyk 2000, a solution of a modified acrylate polymer in methoxypropyl acetate, Disperbyk 2001, a solution of a modified acrylate polymer in a mixture of methoxypropyl acetate, butylglycol and methoxypropanol.

Some dispersants are carried in volatile solvents (as provided by the supplier), and thus may not be suitable for use directly in certain mixing apparatuses. These dispersants can be pre-treated to remove the volatile solvent so that the active component dispersant may optionally be used in the desired mixing device. The volatile solvents can be removed by heating the dispersant at high temperature, for example at 120° C. (optionally under vacuum) to remove the volatile solvent before being used for the mixing process.

In embodiments, a desirable ink composition comprises from about 40 to about 60% by weight of a polyethylene wax, from about 8 to about 18% by weight of a triamide resin, from about 10 to about 20% by weight of a fatty amide, for example stearyl stearamide, from about 5 to about 15% by weight of a rosin ester, from about 0.01 to about 3% by weight of an antioxidant, for example NAUGARD 445, from about 1 to about 7% by weight of a urethane resin (described in Example 4 of U.S. Pat. No. 6,309,453), from about 0.5 to about 15% by weight of pigment, from about 0.5 to about 15% by weight of dispersant and from about 0.01 to about 3% by weight of synergist.

In embodiments, the ink may be prepared by preparing the pigment as a concentrate in a suitable mixing apparatus, such as for example an extruder, kneader, attritor or the like, for subsequent letdown and processing such as by high shear mixing, for example, homogenizing, with other components of the ink vehicle.

In embodiments, in the extrusion process, the synergist, the pigment and the polar resin from the ink formulation, for example the triamide resin, are blended together in powder form before being charged to the extruder. Although the triamide resin may be considered a dispersant for the pigment(s), the blend at this stage can be optionally free of dispersants. The resulting extrudate can then be processed with other ink ingredients to form the phase change ink. The contents in the extruder may then be mixed at elevated temperatures of from about 30° C. to about 150° C., such as from about 50° C. to about 100° C. or from about 60° C. to about 90° C. at about 5 RPM to about 600 RPM, such as at about 25 RPM to about 300 RPM or at about 40 RPM to about 150 RPM. This mixing provides the necessary torque to shear the pigment particles, allowing the synergist to anchor onto the pigment surface. The dispersant may then subsequently be added to the mixture later in the extrusion process, or in embodiments, during the ink making process. The contents are extruded to form an extrudate of the pigment, wherein the sheared pigment has been wetted by the resins, synergist and/or dispersant.

Separate from the extrusion process, the other components of the ink vehicle, for example including at least the wax component, are mixed, for example at temperatures of from about 80° C. to about 150° C., such as from about 80° C. to about 140° C.

The extrudate and the mixed ink vehicle components are then processed by stirring or high shear mixing, for example using a homogenizer or high speed stirrer or the like, to form a stable pigmented solid phase change ink. The present disclosure is not restricted in terms of the choice of ink components used during preparation of the ink concentrate. For example, in some embodiments, both the synergist and dispersant may be present during preparation of the ink concentrate. In other embodiments, it may be desirable to add the synergist to the pigment and/or concentrate prior to addition of the dispersant. As used herein, the ink concentrate refers to, for example, the concentrate of pigment components absent the ink vehicle components.

In further embodiments, the mixing of the extrudate with the remaining components of the ink vehicle may be performed in one or more stages. For example, the homogenization may comprise a first homogenization process with the relatively polar component(s) of the ink and the extrudate, and a second homogenization process wherein the product of the first homogenization process is mixed with at least one of the relatively non-polar component(s) of the ink. Relatively polar components of the ink may include, but are not limited to, fatty amides (for example, KEMAMIDE S 180), and rosin esters such as a glyceryl abietate (for example, KE-100). Relatively non-polar components of the ink may include, but are not limited to, wax such as polyethylene wax. Both homogenization procedures may be conducted at the same or different temperatures, for example at temperatures of from about 60° C. to about 150° C., or from about 80° C. to about 120° C.

Of course, other processes may also be used to form the ink. For example, the dispersant may be present in a mixture to which the pigment is added, with subsequent addition of the synergist either during preparation of the concentrate or the ink itself. This can still result in an adequate stabilized dispersion of the pigment in the ink vehicle, particularly where the synergist has a stronger affinity for the pigment surface than the dispersant.

Furthermore, alternative means of processing may be used for both the preparation of the ink concentrate and the ink itself. For example, the ink concentrates or the inks can be agitated or mixed by any suitable means, including a mechanical or magnetic stirrer, a high speed mixer, an attritor, a homogenizer, a sonificator, a microfluidizer, and the like, with or without optional grinding media, such as stainless steel balls, ceramic chips, and the like.

In embodiments, an attritor may be used as follows. An ink concentrate may be prepared using any attritor by, for example, heating the attritor, for example to an elevated temperature of from about 80° C. to about 180° C. A mixture, desirably pre-melted, of the ink resin, such as the triamide resin, the dispersant, and optional additives, is charged to the attritor. To the stirred mixture is added the pigment and the synergist. These materials are desirably metered into the attritor at a rate allowing the pigment to be reasonably quickly mixed into the mixture. The mixture is then stirred for a sufficient time, for example for about 4 to about 30 hours, such as for about 10 to about 18 hours, at a speed of, for example, from about 100 RPM to about 500 RPM, such as from about 200 RPM to about 300 RPM, while maintaining the elevated temperature of the attritor. Thereafter, any remaining components of the ink, for example including KE100, KEMAMIDE S-180, urethane resin, NAUGARD 445, polyethylene wax and the like, are added to the mixture. Desirably, the remaining ink components are pre-melted, for example at approximately the same temperature as the mixture, and the molten solution poured slowly into the stirred ink concentrate.

The ink fowled may be filtered by any suitable process, for example by filtering with a screen at temperatures of from about 90° C. to about 150° C. Filtration of the prepared ink can be performed using various depth filters, such as for example nylon, polysulfone, and glass fiber filters having absolute ratings of, for example, 6 microns or 1 micron.

The inks disclosed herein may exhibit Newtonian behavior from about 100° C. to 130° C., such as from about 110° C. to about 120° C., at a shear rate of about $10^{-2}$ to about $10^4$ s$^{-1}$, such as from about $10^{-1}$ to about $10^3$ s$^{-1}$.

Phase change ink jet processes are well known and are described, for example, in U.S. Pat. Nos. 4,601,777, 4,251,824, 4,410,899, 4,412,224 and 4,532,530, the disclosures of which are incorporated herein by reference in their entirety.

Ink jetting devices are known in the art. As described in U.S. Pat. No. 6,547,380, the disclosure of which is totally incorporated herein by reference, ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. Different types of drop-on-demand ink jet systems for non-aqueous inks exist. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power.

Printed images may be generated with the ink described herein by incorporating the ink into an ink jet device, for example an acoustic ink jet device or a piezoelectric ink jet device, heating the ink to a suitable jetting temperature, and concurrently causing droplets of the molten ink to be ejected in a pattern onto a substrate such as an intermediate transfer medium or directly onto paper or transparency material, which can be recognized as an image. The ink is typically included in the at least one reservoir connected by any suitable feeding device to the ejecting channels and orifices of the ink jet head for ejecting the ink. In the jetting procedure, the ink jet head may be heated, by any suitable method, to the jetting temperature of the inks. The phase change inks are thus transformed from the solid state to a molten state for jetting. In a typical design of a piezoelectric ink jet device, the image is applied by jetting appropriately colored inks during four to eighteen rotations (incremental movements) of a substrate such as an image receiving member or intermediate transfer member with respect to the ink jetting head, that is, there is a small translation of the printhead with respect to the substrate in between each rotation. This approach simplifies the printhead design, and the small movements ensure good droplet registration.

The inks can also be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate, such as paper or transparency.

Embodiments described above will now be further illustrated by way of the following examples.

Example 1

Inks were prepared using an attritor for preparation of the ink concentrate, as summarized below. Ink concentrate 1 was prepared as follows: a Szegvari 01 Attritor equipped with ⅛ inch stainless steel balls was heated to 120° C. and charged with a pre-melted mixture containing triamide resin 6 (113.4 g), SOLSPERSE® 13240 (with the toluene in the SOLSPERSE® 13240 removed by vacuum at high temperature) (21.0 g), and NAUGARD 445 (0.25 g). To the stirred mixture was added slowly HOSTAPERM Blue B4G (21.0 g), and then SOLSPERSE® 5000 (0.42 g) as the synergist. The mixture was stirred for 16 hours at a speed of 250 RPM and a temperature of 120° C. A diluent solution of KE100 (36.0 g), KEMAMIDE S-180 (40.5 g), urethane resin (12.0 g), NAUGARD 445 (0.25 g), and polyethylene wax (156.0 g) was pre-melted at 120° C. The molten diluent solution was then poured slowly into the stirred ink concentrate (55.7 g), and stirred at 120° C. for a further 1 hour.

The ink was filtered and small amount of the ink was then immediately placed in a glass cell, used for particle size measurements on a Malvern ZetaSizer. The cell was stored in an oven at 120° C.; particle size measurements were taken at various times over the course of 30 days. Inks are considered stable when the particle size growth is limited to less than 15% after 30 days aging at 120 C. The remaining filtered ink was then solidified to form ink sticks for print quality evaluations on a Xerox solid ink jet printer. Good print quality was obtained when there was no ink sticking to the transfuse drum or on to the subsequent recording media, in this case, paper.

Example 2

Ink 2 was prepared using the same method as for Example 1, but the synergist was not added.

Example 3

Ink 3 was prepared using the same method as for Example 1, but a reduced amount of SOLSPERSE® 13240 (13.7 g) was used.

Example 4

Extrusion step (4.1): Admix the following ratio of powder materials in a LITTLEFORD M5 blender for 30 minutes at 0.8 Amperes: 900 g of triamide resin (branched triamide as described in U.S. Pat. No. 7,407,539), 137.63 g HOSTAPERM Blue B4G pigment from Clariant, and 2.92 g SOLSPERSE® 5000 synergist (a copper phthalocyanine derivative that is available from Lubrizol, believed to be a fatty amine salt of sulfonated copper phthalocyanine blue pigment). Subsequently the mixed powder is then charged to a Warner & Pfeiderer Model ZSK30 twin-screw extruder at a rate of 10 lb/hr. The barrels of the extruder were maintained at 60° C. and the rotational speed of the screws is kept at 150 rpm. Subsequently charge 137.63 g of SOLSPERSE® 17000 dispersant (in a separate feeding port) to the extruder for further extrusion. The resulting extrudate (A) is ready to mix with other ink components in a homogenization step.

Homogenization step (4.2): Melt and stir-mix in a 4 L beaker (A) extrudate A (439.86 g), 420 g KEMAMIDE S180 from Crompton Corp., 289.82 g of KE100 resin from Arakawa Chemical Industries Ltd. and 4.18 g of NAUGARD N445 from Crompton Corp. Homogenize the melted mixed ingredients in a IKA Ultra-Turrax T50 Homogenizer for 18 minutes at 120° C. In a separate 4 L beaker (B), melt 1635.92 g polyethylene wax (a polyethylene wax having an average peak molecular weight of from about 350 to about 730, a polydispersity of from about 1.03 to about 3.0, and an asymmetrical molecular weight distribution skewed toward the high molecular weight end, as described in U.S. Pat. No. 7,407,539) from Baker Petrolite and 96.83 g of the urethane resin described in Example 4 of U.S. Pat. No. 6,309,453 for an hour at 120° C. Add the melted ingredients in beaker (B) to beaker (A). Further homogenize the resulting ink ingredients in beaker (A) for another 18 minutes. Filter the ink through a 1 micron cartridge filter at 120° C. and cool the ink to form a solid pigmented phase change ink.

Example 5

Conduct the same steps as in Example 4, but without the use of SOLSPERSE® 5000.

Example 6

Extrusion step: Conduct the same as extrusion step (4.1) as in Example 4 above, except a reduced the amount of SOLSPERSE® 17000 (89.5 g) is used.

Example 7

Conduct the process the same as in Example 6 above, except replacing the HOSTAPERM B4G with NIPEX 150 from Degussa.

Example 8

Melt 89.5 g of SOLSPERSE® 17000, together with 900 g of triamide resin and 137.6 g of HOSTAPERM blue pigment at 120° C. for 30 min. The resulting solid mixture, after cooling to room temperature, is then further blended with 2.92 g SOLSPERSE® 5000 synergist in a LITTLEFORD M5 blender for 30 minutes. The mixed powder is then charged to a Warner & Pfeiderer Model ZSK30 twin-screw extruder at a rate of 10 lb/hr. The barrels of the extruder were maintained at 60° C. and the rotational speed of the screws is kept at 150 rpm. The resulting extrudate is then homogenized with other ink ingredients as in homogenization step 4.2.

Example 9

Conduct the process the same as in Example 6 above, except that SOLSPERSE® 5000 synergist (0.9 g), is melted mixed together with the 5180, the KE 100 and the NAUGARD N445) in the homogenization step in (4.2) rather than in the extrusion step.

Summarized in Table 1 are the relative performances of the inks with regard to particle size stability after being aged at 120° C. for 30 days as well as tackiness of the prints.

TABLE 1

Ink Particle Size Thermal Stability and Tackiness Quality of Print

| Example | Process | Ink Stability | Print quality |
|---|---|---|---|
| 1 | Attrition | Stable | Tacky |
| 2 | Attrition | Unstable | Tacky |
| 3 | Attrition | Stable | Not Tacky |
| 4 | Extrusion and homogenization | Stable | Tacky |
| 5 | Extrusion and homogenization | Unstable | Tacky |
| 6 | Extrusion and homogenization | Stable | Not Tacky |
| 7 | Extrusion and homogenization | Stable | Not Tacky |
| 8 | Extrusion and homogenization | Stable | Not Tacky |
| 9 | Extrusion and homogenization | Stable | Not Tacky |

The effect of the synergist with reduced dispersant loadings in the above examples can be seen both in terms of the enhanced particle size stability at 120° C. for 30 days as well as in the reduction of the tackiness of the ink on the transfuse drum and on the imaged print.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of making a phase change ink composition, comprising
adding to a device with a stirring element at least one pigment, at least one dispersant soluble in an ink vehicle of the ink composition and at least one solid synergist insoluble in the ink vehicle,
processing the device at an elevated temperature and at a stirring rate to wet the at least one pigment to obtain an ink concentrate, and
mixing the ink concentrate with the ink vehicle to obtain the ink composition.

2. The method according to claim 1, wherein the adding further includes adding at least one amide resin to the device.

3. The method according to claim 1, wherein the device with a stirring element is an extruder or an attritor.

4. The method according to claim 3, wherein the device with a stirring element is an extruder, and wherein the elevated temperature is from about 30° C. to about 150° C. and the stirring is from about 5 RPM to about 600 RPM.

5. The method according to claim 3, wherein the device with a stirring element is an attritor, and wherein the elevated temperature is from about 80° C. to about 180° C. and the stirring is from about 100 RPM to about 500 RPM.

6. The method according to claim 1, wherein the process further comprises forming the ink vehicle, prior to the mixing with the ink concentrate, by mixing components of the ink vehicle at temperatures of from about 90° C. to about 150° C.

7. The method according to claim 1, wherein the process further comprises filtering the ink composition.

8. The method according to claim 7, wherein the filtering is at temperatures of from about 90° C. to about 150° C.

9. The method according to claim 1, wherein the ink vehicle comprises at least one wax and at least one urethane resin.

10. The method according to claim 1, wherein ink vehicle includes at least one wax, the at least one solid synergist being insoluble in the at least one wax and including at least one functional group that adsorbs to the surface of the at least one pigment, and the at least one dispersant having a portion soluble in the at least one wax.

11. The method according to claim 10, wherein the wax is a polyethylene wax.

12. A method of making a phase change ink composition, comprising
adding to an extruder at least one pigment and at least one solid synergist that is insoluble in an ink vehicle of the ink composition,
processing the extruder to wet and shear the at least one pigment,
following the processing to wet and shear the at least one pigment, adding to the extruder at least one dispersant for the at least one pigment, the at least one dispersant being soluble in the ink vehicle,
extruding to obtain an extrudate, and
homogenization of the extrudate with the ink vehicle to obtain the ink composition.

13. The method according to claim 12, wherein the processing to wet and shear the at least one pigment is conducted at a temperature of from about 45° C. to about 100° C., the extruding is conducted at a temperature of from about 30° C. to about 150° C. at about 5 RPM to about 600 RPM, and the homogenization is at temperatures of from about 90° C. to about 150° C.

14. The method according to claim 12, wherein the process further comprises filtering the ink composition.

15. The method according to claim 14, wherein the filtering is at temperatures of from about 90° C. to about 150° C.

16. The method according to claim 12, wherein the mixture processed to wet and shear the pigment further includes a triamide resin.

17. The method according to claim 12, wherein the homogenization comprises a first homogenization process with at least one polar component and the extrudate, and a second homogenization process wherein the product of the first melt mixing process is mixed with at least one non-polar component.

18. The method according to claim 12, wherein ink vehicle includes at least one wax, the at least one solid synergist being insoluble in the wax and including at least one functional group that adsorbs to the surface of the at least one pigment, and the at least one dispersant having a portion soluble in the wax.

19. The method according to claim 18, wherein the wax is a polyethylene wax.

20. A method of making a phase change ink composition having a reduced amount of dispersant for pigment, comprising
determining an amount of dispersant in an ink composition comprised of at least one pigment and at least one dispersant soluble in an ink vehicle of the ink composition, but free of solid synergist,
reducing the amount of the dispersant to include in the ink composition by from about 10% to about 90% by weight of the dispersant,
adding to a device with a stirring element the at least one pigment and the at least one reduced amount of dispersant of the ink composition, along with at least one solid synergist that is insoluble in the ink vehicle,
processing the device at an elevated temperature and at a stirring rate to wet the at least one pigment to obtain an ink concentrate, and
mixing the ink concentrate with the ink vehicle to obtain the ink composition with the reduced amount of dispersant.

21. The method according to claim 20, wherein the amount of dispersant is reduced by about 60% to abut 75% by weight of the dispersant.

* * * * *